US008436752B2

(12) United States Patent
Chen

(10) Patent No.: US 8,436,752 B2
(45) Date of Patent: May 7, 2013

(54) INPUT KEY SUBASSEMBLY FOR MINIMIZING EMISSION OF LIGHT FROM UNINTENDED PATHS

(75) Inventor: Chao Chen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1174 days.

(21) Appl. No.: 12/338,177

(22) Filed: Dec. 18, 2008

(65) Prior Publication Data

US 2010/0085217 A1 Apr. 8, 2010

Related U.S. Application Data

(60) Provisional application No. 61/103,791, filed on Oct. 8, 2008.

(51) Int. Cl.
*H03K 17/94* (2006.01)
*H04M 1/02* (2006.01)

(52) U.S. Cl.
USPC .................................. 341/34; 341/20; 341/22

(58) Field of Classification Search .................... 341/20, 341/22, 34
See application file for complete search history.

(56) References Cited

U.S. PATENT DOCUMENTS

| | | | | |
|---|---|---|---|---|
| 3,276,058 A | * | 10/1966 | Harrington et al. | 12/147 R |
| 3,295,216 A | * | 1/1967 | Harrington et al. | 269/40 |
| 3,789,638 A | * | 2/1974 | Roberts et al. | 70/366 |
| 5,568,367 A | * | 10/1996 | Park | 362/109 |
| 5,747,756 A | * | 5/1998 | Boedecker | 200/5 A |
| 7,488,910 B2 | * | 2/2009 | Hong | 200/310 |
| 7,683,279 B2 | * | 3/2010 | Kim | 200/310 |
| 7,786,623 B2 | * | 8/2010 | Farmer et al. | 307/117 |
| 7,841,791 B2 | * | 11/2010 | Iso | 400/491.2 |
| 7,880,175 B2 | * | 2/2011 | Shin et al. | 257/78 |
| 2007/0257822 A1 | * | 11/2007 | Lee et al. | 341/22 |
| 2008/0030975 A1 | * | 2/2008 | Miyashita et al. | 362/26 |
| 2008/0143560 A1 | * | 6/2008 | Shipman | 341/22 |

FOREIGN PATENT DOCUMENTS

| | | |
|---|---|---|
| EP | 1724800 A1 | 11/2006 |
| EP | 1901321 A2 | 3/2008 |

OTHER PUBLICATIONS

Extended European Search Report dated Jul. 13, 2009. In corresponding application No. 08172115.1.
http://gadgets.boingboing.net/2007/09/18/motorola-rokr-e8-mus.html. Retrieved Sep. 18, 2007.
http://www.motorola.com/consumers/v/item.jsp?vgnextoid=4ab53ec3f295a110VgnVCM1000008406b00aRCRD&localeld=33. Retrieved from the internet Nov. 2, 2011.

(Continued)

*Primary Examiner* — Anh V La
*Assistant Examiner* — Amine Benlagsir
(74) *Attorney, Agent, or Firm* — Fitch, Even, Tabin & Flannery LLP

(57) ABSTRACT

An input key subassembly for a handheld communication device is disclosed herein. The input key subassembly includes a dome overlay panel and a lightguide panel. The dome overlay panel includes a dome overlay layer and a dome switch having a peak facing frontally. The dome overlay layer has a front face located adjacent to the backside of the lightguide panel. The lightguide panel has at least one keystem and is located above a respective dome switch. A recessed perimeter region about the keystem has a height relative to the backside of the lightguide panel that is less than a height between the front side of the lightguide panel and the backside of the lightguide panel.

15 Claims, 6 Drawing Sheets

OTHER PUBLICATIONS http://www.mrgadget.com.au/labels/keyboard.html.retrieved. Retrieved from the Internet Nov. 2, 2011.

http://www.logitech.com/index.cfm/keyboards/keyboard/devices/192&cl=US,EN. Retrieved Nov. 2, 2011.

* cited by examiner

INPUT KEY SUBASSEMBLY FOR MINIMIZING EMISSION OF LIGHT FROM UNINTENDED PATHS

PRIORITY CLAIM

This application claims priority benefit to Application 61/103,791 which was filed on 8 Oct. 2008. Application 61/103,791 is fully incorporated by reference herein.

FIELD

This disclosure, in a broad sense, is directed toward an electronic device that has communication capabilities. The present disclosure further relates to reducing the release of light from unintended paths within an input key subassembly of such an electronic communication device.

BACKGROUND

With today's proliferation of communication systems, compatible communication devices are also becoming more prevalent, as well as advanced. Examples of communication devices include both handheld communication devices as well as larger devices such as laptop computers, desktop computers and the like. These devices are capable of sending and receiving a variety of different messages including, but not limited to, short message service (SMS), multimedia message service (MMS), emails, voice messages, and the like.

Often these communication devices are equipped with physical keyboards. One benefit of a physical keyboard is that it typically provides the user tactile feedback. The tactile feedback from the keyboard can be achieved in a variety of ways including the use of one or more dome switches that are typically incorporated, one each, with depressible "keys" of the keyboard. The structure of the dome switch is collapsible.

While tactile feedback benefits the user in entering text, the average user must primarily rely on his/her sense of vision to confirm the accuracy in typing. Therefore, one process known in the art is to utilize a lighting source to shine through, upon, or around an intended group of keys so that the lit keys may be better recognized by the user. Such lighting is especially helpful when using the handheld communication device in a dark environment with reduced visibility. But the lighting source must be controlled so that it only highlights the appropriate keys. A user may be confused if light seeps from the lighting source such that in addition to highlighting a designated key, the light erroneously highlights an undesignated key. For example, if the user is using the phone-function on a handheld communication device with a reduced alphanumeric keyboard, the user would likely prefer that only those keys possessing numeric characters be highlighted. However, should other keys be erroneously highlighted as well, ones that are not used in connection with the phone function, the user may confuse some of the erroneously highlighted keys as intended for the phone function. Therefore, since the lighting source is intended to benefit the user by distinguishing those keys that are appropriate for a particular function (i.e. numeric keys for telephone functionality), it is important that the lighting source not inadvertently seep and highlight inappropriate keys.

As mentioned hereinabove, providing a keypad which provides both tactile feedback and utilizes a lightsource to provide further visual feedback is beneficial to the user of a handheld communication device. However, a current problem in the art makes it difficult to accomplish both functions on the same device. Specifically, to acquire better tactile feedback in a keypad, a small interference, between approximately 0.1 and 0.15 mm, must be added to the key's actuator and dome. However, in adding this interference, the increased height of the actuator and dome, when fully assembled, may apply pressure against the light-restricting film used to direct the light emitted from a lightsource. As a result, the light, no longer being optimally restricted, may seep and erroneously highlight other keys. Thus it is desirable to control the light's distribution to the keyboard and also reduce or eliminate unintended light "leaks" or emissions while retaining the desired tactile feedback associated with a physical keyboard.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

Figure 1:
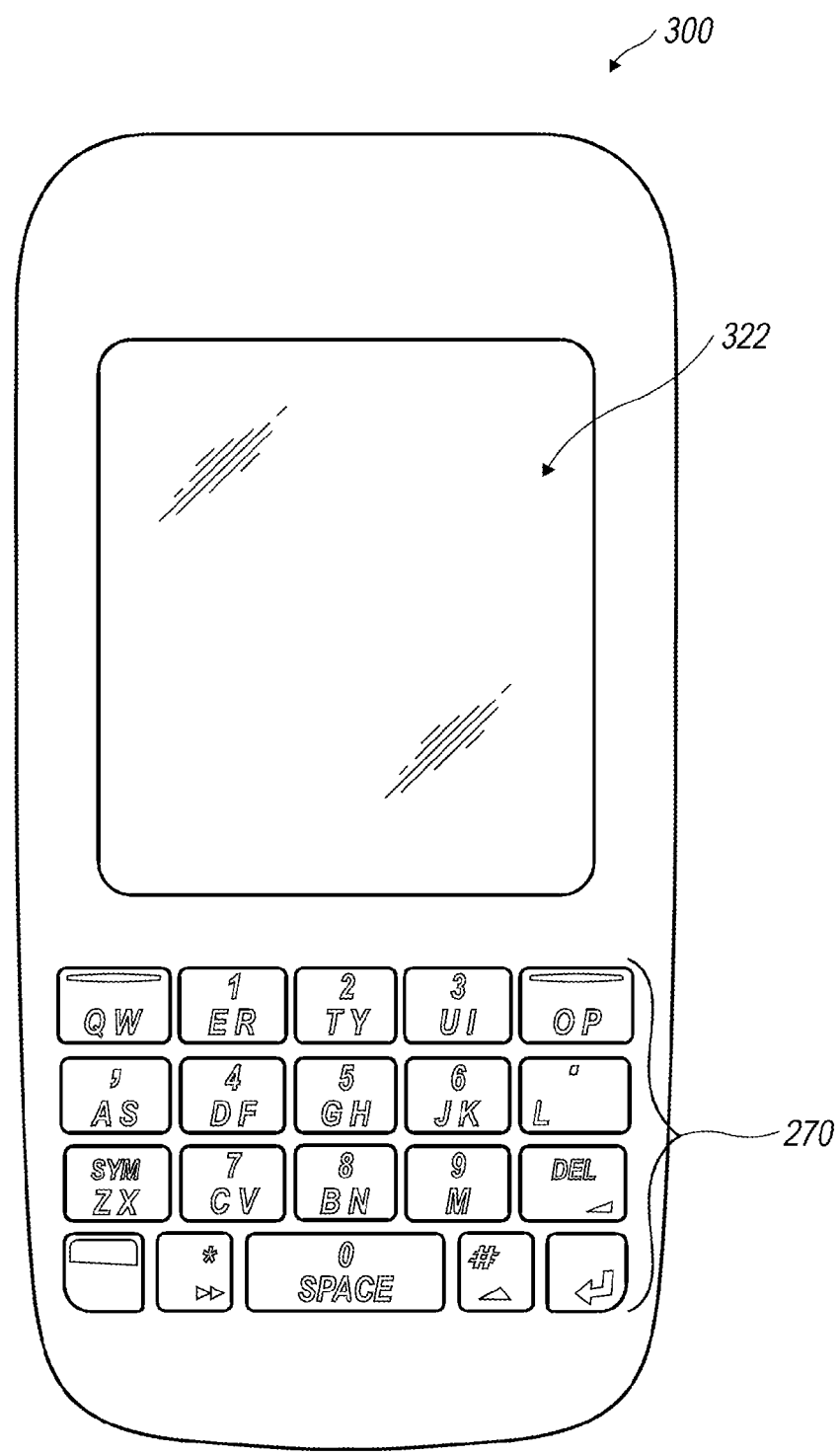
FIG. 1 illustrates an exemplary handheld communication device having a reduced QWERTY keyboard.
Figure 2:
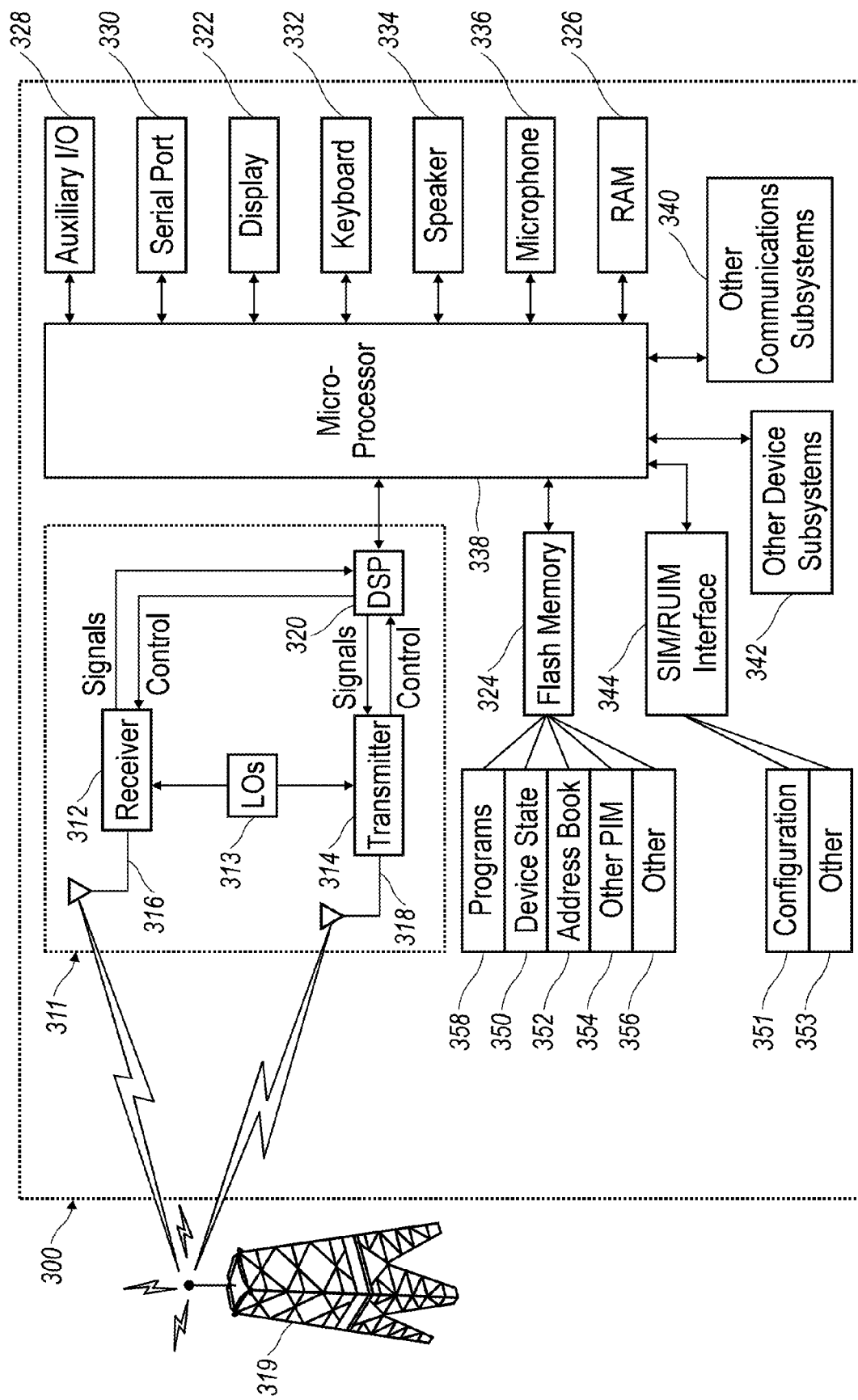
FIG. 2 is a block diagram representing a handheld communication device interacting in a communication network.

An exemplary communication device 300 is shown in FIG. 1, and the device's cooperation in a wireless network 319 is exemplified in the block diagram of FIG. 2. These figures are exemplary only, and those persons skilled in the art will appreciate the additional elements and modifications necessary to make the communication device 300 work in particular network environments. While in the illustrated embodiment, the communication device 300 comprises a handheld communication device, and in this particular example, a smart phone, in other embodiments, the communication device 300 may comprise a handheld wireless communication device, a personal digital assistant (PDA), laptop computer, desktop computer, a server, or other communication device.

As shown in the block diagram of FIG. 2, the communication device 300 includes a microprocessor 338 that controls the operation of the communication device 300. A communication subsystem 311 performs all communication transmission and reception with the wireless network 319. The microprocessor 338 further can be connected with an auxiliary input/output (I/O) subsystem 328 which can be connected to the device. Additionally, in at least one embodiment, the microprocessor 338 can be connected to a serial port (for example, a Universal Serial Bus port) 330 which can allow for communication with other devices or systems via the serial port 330. A display 322 can be connected to microprocessor 338 to allow for displaying of information to an operator of the device. When the communication device 300 is equipped with a keyboard 332, the keyboard 332 can also be connected with the microprocessor 338. The communication device 300 can include a speaker 334, a microphone, 336, random access memory (RAM) 326, and flash memory 324 all of which may be connected to the microprocessor. Other similar components may be provided on the device as well and optionally connected to the microprocessor 338. Other communication subsystems 340 and other communication device subsystems 342 are generally indicated as being functionally connected with the microprocessor 338 as well. An example of a communication subsystem 340 is that of a short range communication system such as BLUETOOTH® communication module or a WI-FI® communication module (a communication module in compliance with IEEE 802.11b) and associated circuits and components. Additionally, the microprocessor 338 is able to perform operating system functions and enables execution of programs on the communication device 300. In some embodiments not all of the above components may be included in the communication device 300. For example, in at least one embodiment the keyboard 332 is not provided as a separate component and is instead integrated with a touchscreen as described below.

The auxiliary I/O subsystem 328 can take the form of a variety of different navigation tools (multi-directional or single-directional) such as a trackball navigation tool, a thumbwheel, a navigation pad, a joystick, touch-sensitive interface, or other I/O interface. These navigation tools may be located on the front surface of the communication device 300 or may be located on any exterior surface of the communication device 300. Other auxiliary I/O subsystems can include external display devices and externally connected keyboards (not shown). While the above examples have been provided in relation to the auxiliary I/O subsystem 328, other subsystems capable of providing input or receiving output from the communication device 300 are considered within the scope of this disclosure. Additionally, other keys may be placed along the side of the communication device 300 to function as escape keys, volume control keys, scrolling keys, power switches, or user programmable keys, and may likewise be programmed accordingly.

As may be appreciated from FIG. 1, the communication device 300 comprises a lighted display 322 located above a field of input keys 270 constituting a user input and suitable for accommodating textual input to the communication device 300. As shown, the communication device 300 is of unibody construction, also known as a "candy-bar" design.

Keys, typically of a push-button or push-pad nature, perform well as data entry devices but present problems to the operator when they must also be used to effect navigational control over a screen-cursor. In order to solve this problem the present communication device 300 may include an auxiliary input that acts as a cursor navigation tool and which is also exteriorly located upon the front face of the communication device 300. Its front face location allows the tool to be easily thumb-actuable like the field of input keys 270. An embodiment provides the navigation tool in the form of a trackball (not shown) which can be utilized to instruct two-dimensional screen cursor movement in substantially any direction, as well as act as an actuator when the trackball is depressed like a button. The placement of the navigation tool may be above the field of input keys 270 and below the display screen 322; here, it can avoid interference during keyboarding and does not block the operator's view of the display screen 322 during use.

As illustrated in FIG. 1, the communication device 300 may be configured to send and receive messages. The communication device 300 includes a body which may, in some embodiments, be configured to be held in one hand by an operator of the communication device 300 during text entry.

A display 322 is included which is located on a front face of the body and upon which information is displayed to the operator during text entry. The communication device 300 may also be configured to send and receive voice communications such as mobile telephone calls.

Furthermore, the communication device 300 is equipped with components to enable operation of various programs as shown in FIG. 2. In an exemplary embodiment, the flash memory 324 is enabled to provide a storage location for the operating system, device programs 358, and data. The operating system is generally configured to manage other programs 358 that are also stored in memory 324 and executable on the processor 338. The operating system honors requests for services made by programs 358 through predefined program 358 interfaces. More specifically, the operating system typically determines the order in which multiple programs are executed on the processor 338 and the execution time allotted for each program 358, manages the sharing of memory 324 among multiple programs 358, handles input and output to and from other device subsystems 342, and so on. In addition, operators can typically interact directly with the operating system through a user interface usually including the keyboard 332 and display screen 322. While in an exemplary embodiment the operating system is stored in flash memory 324, the operating system in other embodiments is stored in read-only memory (ROM) or similar storage element (not shown). As those skilled in the art will appreciate, the operating system, device program 358 or parts thereof may be loaded in RAM 326 or other volatile memory.

In one exemplary embodiment, the flash memory 324 contains programs 358 for execution on the communication device 300 including an address book 352, a personal information manager (PIM) 354, and the device state 350. Furthermore, programs 358 and other information 356 including data can be segregated upon storage in the flash memory 324 of the communication device 300.

When the communication device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 300 may require a unique identifier to enable the communication device 300 to transmit and receive signals from the communication network 319. Other systems may not require such identifying information. GPRS, UMTS, and EDGE use a Subscriber Identity Module (SIM) in order to allow communication with the communication network 319. Likewise, most CDMA systems use a Removable Identity Module (RUIM) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the communication device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled communication device 300 is able to both transmit and receive information from the communication network 319. The transfer of communication can be from the communication device 300 or to the communication device 300. In order to communicate with the communication network 319, the communication device 300 in the presently described exemplary embodiment is equipped with an integral or internal antenna 318 for transmitting signals to the communication network 319. Likewise the communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the communication device 300.

When equipped for two-way communication, the communication device 300 features a communication subsystem 311. As is understood in the art, this communication subsystem 311 is modified so that it can support the operational needs of the communication device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the communication device 300 with the wireless network 319 can be any type of communication that both the wireless network 319 and communication device 300 are enabled to transmit, receive and process. In general, these can be classified as voice and data. Voice communication generally refers to communication in which signals for audible sounds are transmitted by the communication device 300 through the communication network 319. Data generally refers to all other types of communication that the communication device 300 is capable of performing within the constraints of the wireless network 319.

Example device programs that can depend on such data include email, contacts and calendars. For each such program synchronization with home-based versions on the programs can be desirable for either or both of their long term and short term utility. As an example, emails are often time sensitive, so substantially real time synchronization may be desired. Contacts, on the other hand, can be usually updated less frequently without inconvenience. Therefore, the utility of the communication device 300 is enhanced when connectable within a communication system, and when connectable on a wireless basis in a network 319 in which voice, text messaging, and other data transfer are accommodated.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 322, which in one embodiment is enabled by touching the display screen 322, for example, with a stylus, finger, or other pointer, to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular program or feature of the communication device 300 is shown on the display screen 322 in the same configuration as the physical keys. Using this configuration, the operator can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3:
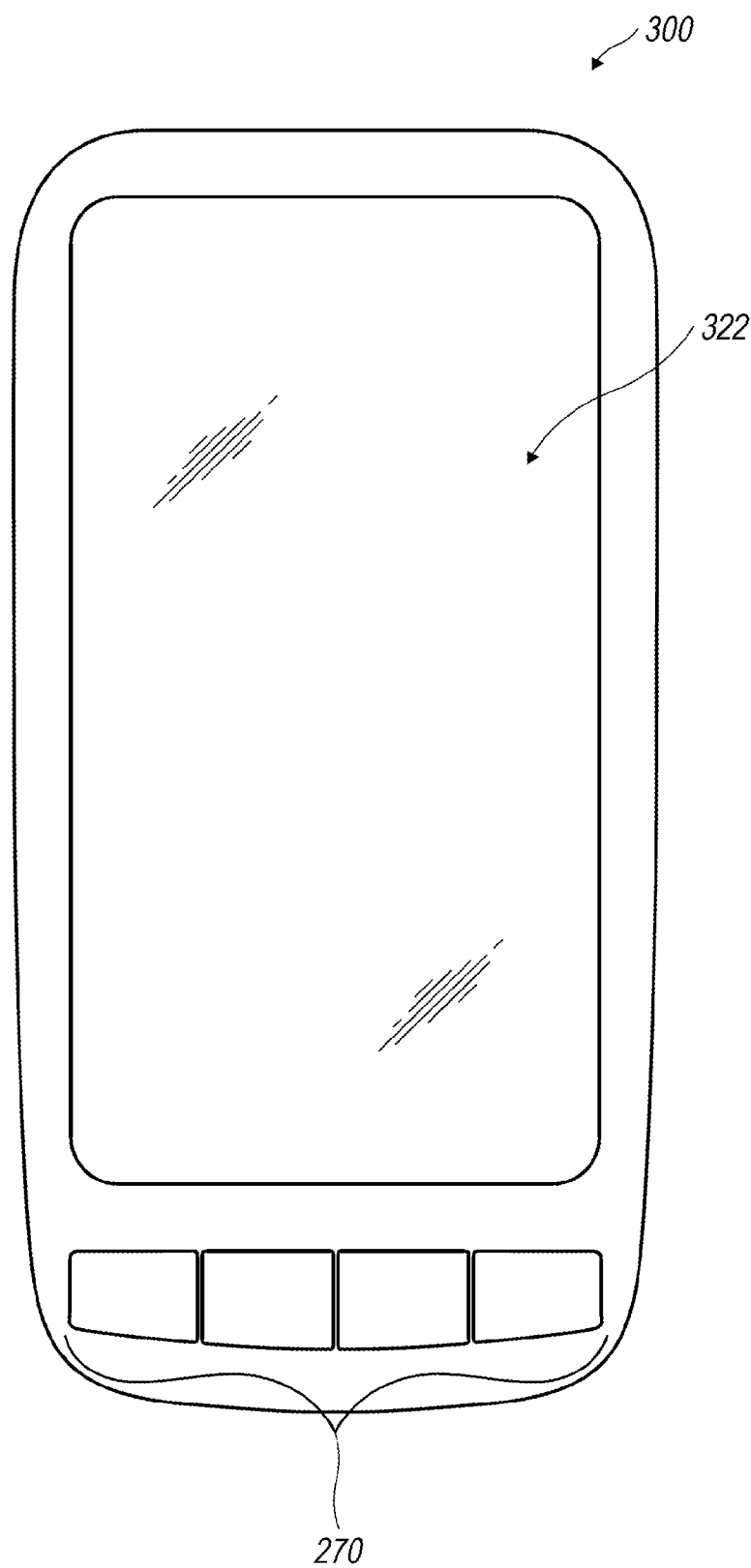
FIG. 3 illustrates another exemplary handheld communication device.

The physical keys can provide both tactile feedback to the user and in some embodiments, the physical keys can be illuminated via a light source. FIG. 5 isolates the navigation row of FIG. 3 to reveal an input key subassembly 260 (fully assembled) that supports the physical input keys 270. Likewise, FIG. 4 is an exploded view of the input key subassembly 260 of FIG. 5 and it shows some of the typical components found in the input key subassembly 260 of the handheld communication device 300.

Keyboards 322 and keypads are often composed of several different elements forming the input key subassembly 260. The input key subassembly 260 allows a user of the handheld device 300 to input data. An exploded view of an example of the input key subassembly 260 is illustrated in FIG. 4. While the illustrated components of the input key subassembly 260 are illustrated as separate components, in some embodiments these components can be bonded or affixed together during or after manufacturing to become a unified piece. Furthermore, during manufacturing one or more of the elements of the input key subassembly 260 may be formed together to form a unitary structure out of separate components. Examples of these details will be provided hereinbelow. As illustrated, the input key subassembly 260 has a field of input keys 270. While the field of input keys 270 number four in the illustrated embodiment, the number of keys in a field of input keys 270 can vary, such as is demonstrated by the field of input keys 270 of FIG. 1. Other arrangements having different numbers of keys in the key fields are also contemplated.

Figure 4:
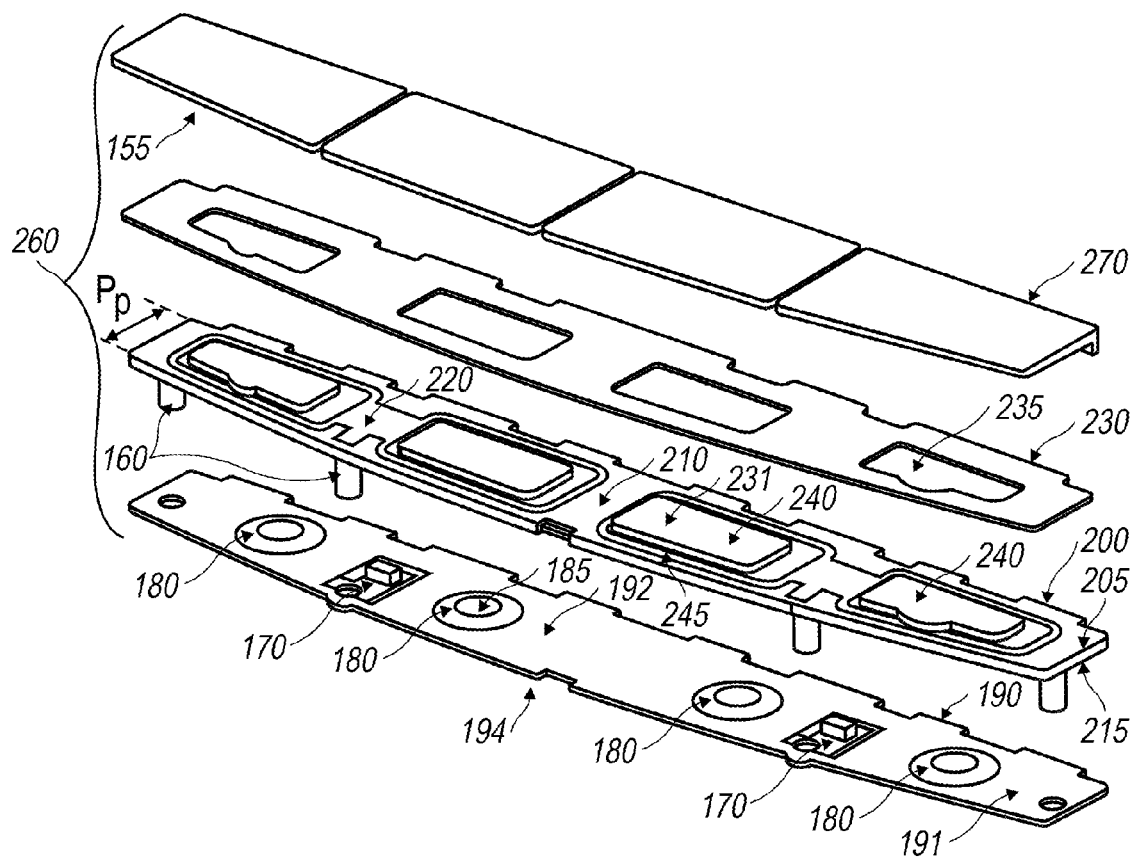
FIG. 4 is an exploded view of an input key assembly configured according to the present disclosure and as shown in FIG. 3.
Figure 5:
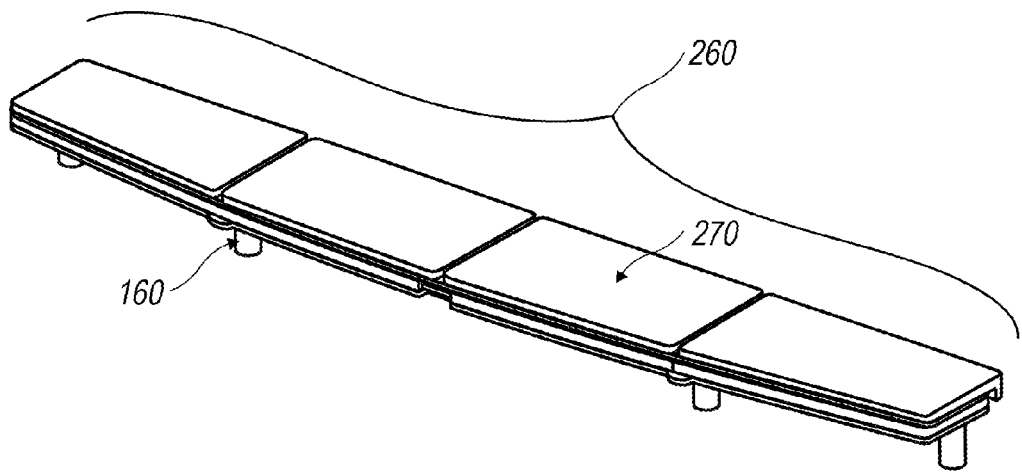
FIG. 5 is an assembled view of the input key assembly of FIG. 4.

In the illustrated embodiment of FIG. 4 four different panels are illustrated. In other embodiments, more than four panels may be implemented as well. The panel located on the bottom of FIG. 4 is a dome overlay panel 191. The dome overlay panel 191 comprises a dome overlay layer 190 that overlays at least one depressible dome switch 180. The dome overlay panel 191 has a front face 192 opposed to a back face 194. As illustrated, the dome switch 180 has a peak 185 facing frontally. While in the presently described exemplary embodiment one dome switch 180 is provided for each one of the input keys 270, in other embodiments more than one dome switch 180 or less than one dome switch 180 per key 270 can be provided. These components of the dome overlay panel 191 may be bonded together to form a unitary structure or they may be fixedly attached to one another. In at least one embodiment, the dome overlay panel 191 is constructed from a light reflecting material. In another embodiment, the dome overlay panel 191 may include a film or other coating to enable reflection of light from the dome overlay panel 191 as well. This reflective property can be used to direct light away from the dome overlay panel 191 and forward through the input key subassembly 260.

In this regard, at least one concentrated light source 170 is included on the dome overlay panel 191. As illustrated, two concentrated light sources 170 are shown on the dome overlay panel. In other embodiments, more than two concentrated light sources 170 may be included on the dome overlay panel 191. The concentrated light source 170 can be for example a light emitting diode. Other examples of concentrated light sources 170 include fluorescent light sources, incandescent light sources, and other similar light sources. Depending on the nature of the keyboard 332 (i.e. number of keys, full keyboard or reduced keyboard, etc), any number of light sources 170 may be used. The concentrated light sources 170 allow light to be emitted through a top surface of the input keys 270 thereby illuminating indicia associated with the input keys 270. In at least one embodiment, the dome overlay panel 191 can be a printed circuit board.

As shown in FIG. 4, another element of the input key subassembly 260 is the lightguide panel 200. As illustrated, the lightguide panel 200 is positioned in front of the dome overlay panel 191. ("in front of" is above in the FIG.) The light guide panel 200 has a front side 205 and back side 215. The back side 215 of the lightguide panel 200 is shown above the front face 192 of the dome overlay layer. The lightguide panel 200 can have at least one connector 160 extending from the back side of the lightguide panel 215 to removably engage the dome overlay panel 191. As illustrated, four connectors 160 extend from the back side of the lightguide panel 215, but in other embodiments greater or fewer connectors are contemplated as being within the scope of this disclosure in order to secure the lightguide panel 200 to the dome overlay panel 191.

As illustrated, the lightguide panel 200 comprises a portion of a light transmitting material 220 and a portion of a light impeding material 210. The light impeding material 210 is located about an outer perimeter of the portion of the light transmitting material 220. The light transmitting material 220 can be made of a polymer. The light transmitting material 220 can be a pliable material such as a rubber or a plastic. Further, the light transmitting material 220 can be transparent, a semi-transparent, or a translucent material. These types of materials allow for the light emitted from the concentrated light source 170 to pass through the lightguide panel 200 to the input key 270. The light transmitting material 220 can be colored or white or clear. The light impeding material 210 is a material that resists or prevents the transmission of light. For example, this material can be an opaque material 230. In at least one embodiment, the material is black. In other embodiments, the light impeding material 210 can be another color.

In at least one embodiment, the light impeding material 210 is bonded to the light transmitting material 220 so as to form an integral component. For example, the light impeding material 210 and light transmitting material 220 can be a plastic or rubber that can be formed as an integral component when they are molded together. This can be done using injection molding techniques, for example. The light impeding material 210 can also be a pliable material such as rubber or plastic.

The lightguide panel 200 can also include one or more keystems 240 extending from a front face 205 of the portion of the light transmitting material 220. In the illustrated embodiment, four keystems 240 are shown. Each keystem 240 extends from a front face 205 of the portion of the light transmitting material 220 through the through holes 235 of the opaque material 230. A front face 231 of the keystem 240 which is located on a distal end furthest from the connectors 160 and adjacent a backside 155 of an input key 270. The input key 270 can be constructed from a single piece of material, and in some embodiments can made from plastic. While in another embodiment, the input key 270 can be constructed from a film on plastic technology allowing the plastic to be labeled with the desired alphanumeric indicia. In at least one embodiment, the physical keys can be flexible allowing each individual key 270 to move substantially independent of the other keys.

A back side 245 of each keystem 240 is located above a respective dome switch 180. The keystem 240 can also be molded together with the other components of the lightguide panel 200 such as the light transmitting material 220. The keystem 240 can also be transparent, semi-transparent, or translucent. Additionally, the keystem 240 can be white, clear or colored.

Figure 7:
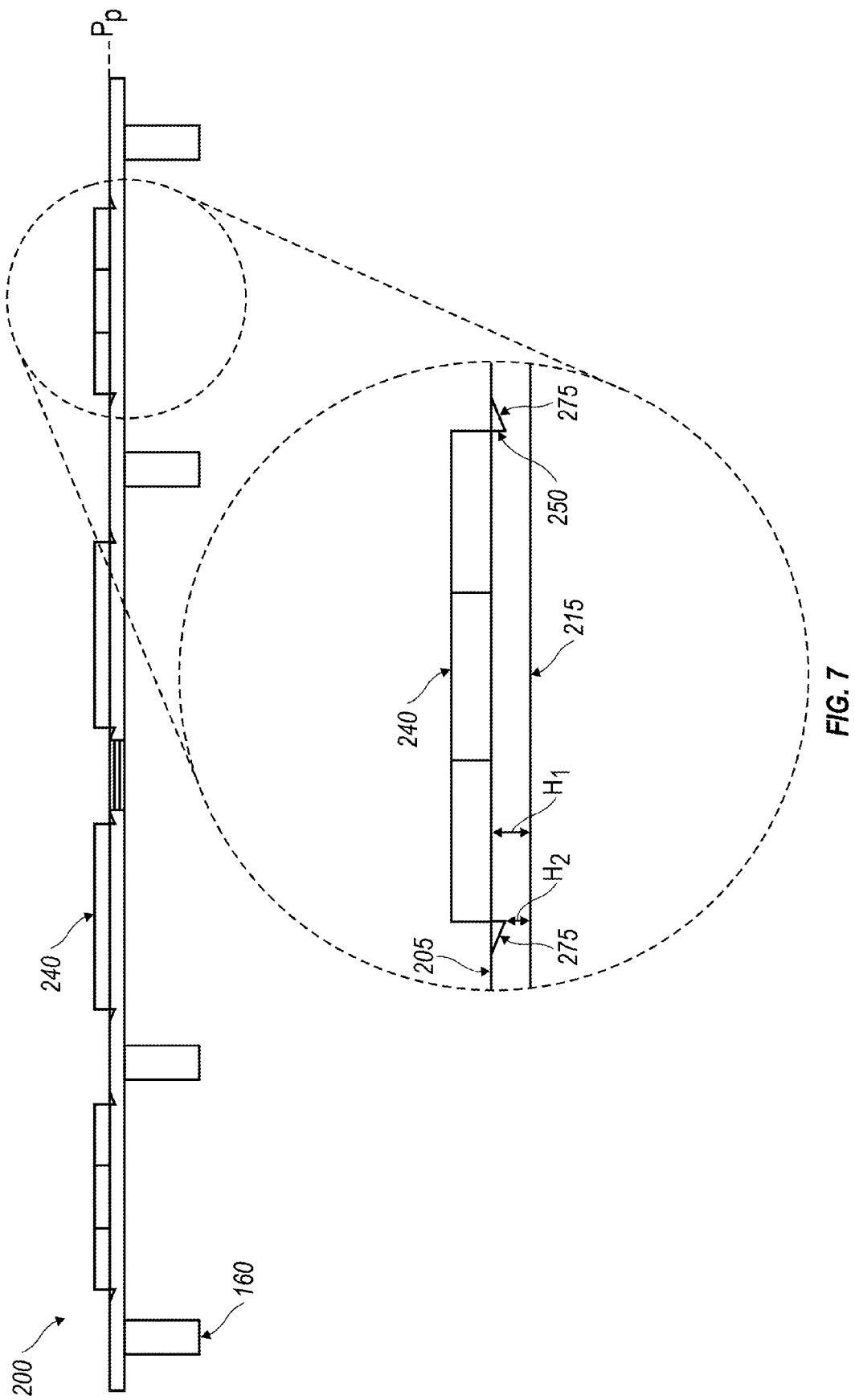
FIG. 7 is a cutaway front elevational view of the lightguide panel of FIG. 4, including a detail of a recessed perimeter region.

When the lightguide panel 200 is situated positioned in front of at least one dome switch 180, the domes switch 180 places pressure against the lightguide panel 200 such that the opaque material 230 that lays flat across the front side 205 of the lightguide panel 200 is caused to bow (i.e. not lay flat against the lightguide panel 200). As a result, light that should only be able pass through the keystems 240 (when the opaque material 230 is properly fitted against and covering the lightguide panel 200) will now shine through any portions of the light transmitting material 220 that are not covered by the opaque material 230. In other words, light will seep. As described herein, the emission of light is reduced or substantially eliminated using the configuration of the lightguide 200 and input key subassembly 260 as described herein. As shown in FIG. 7, at least a portion of the lightguide panel front side 205 comprising the light impeding material 210 has a first height $H_1$ relative to the backside 215 of the lightguide panel. Additionally, at least a portion of the lightguide panel front side 205 comprising the light transmitting material 220 about the keystem 240 defines a recessed perimeter region 250 about the keystem 240 having a height $H_2$ relative to the backside 215 of the lightguide panel less than the first height $H_1$.

Figure 6:
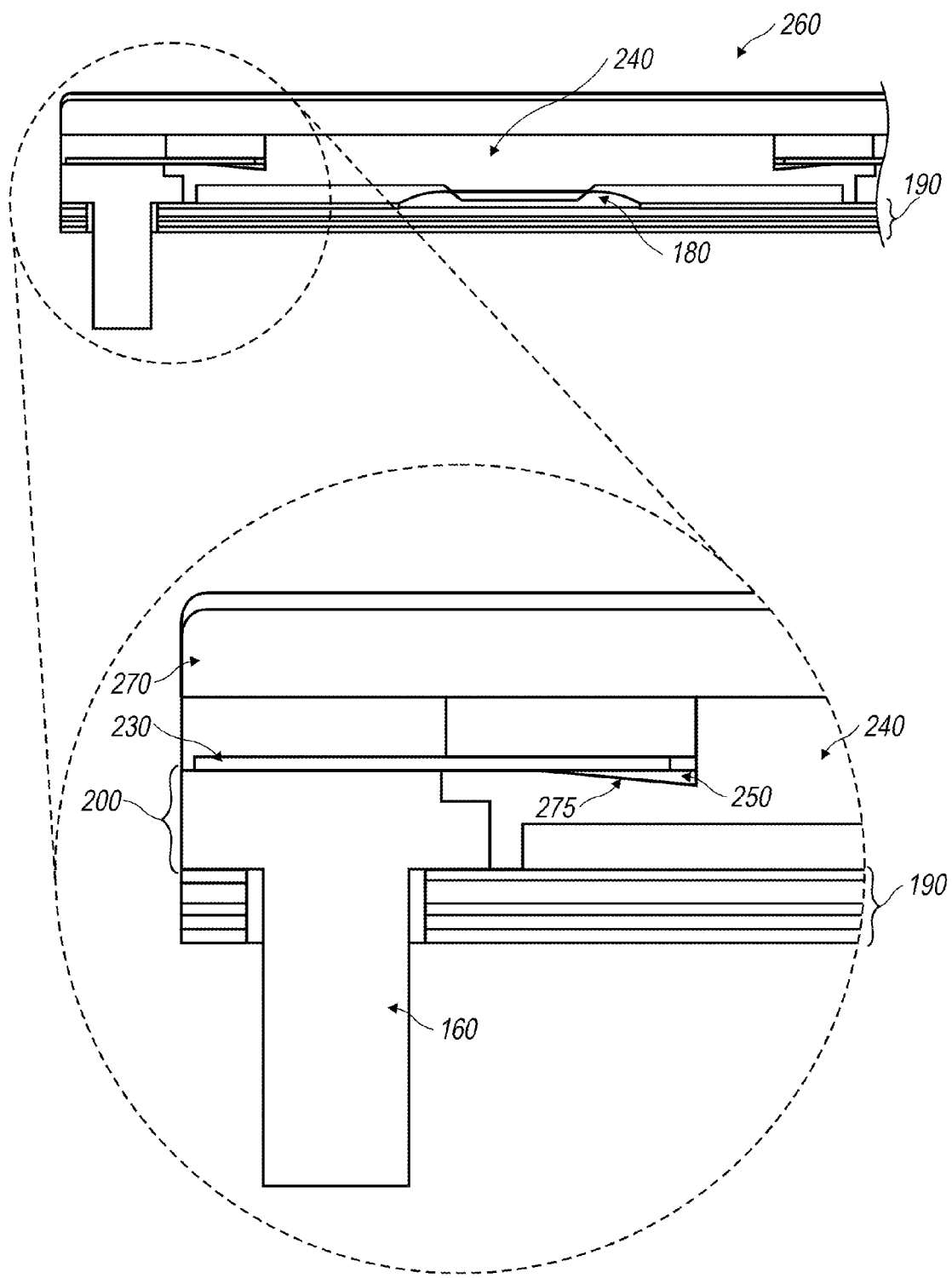
FIG. 6 is a cutaway front elevational view of the input key assembly of FIG. 4, including a detail of a recessed perimeter region.

In at least one embodiment, at least a portion of the lightguide panel front side 205 comprising the light impeding material 210 lies in a phantom plane $P_P$, as illustrated in FIG. 4. The recessed perimeter region 250 (as shown in FIG. 6 and FIG. 7) is below the phantom plane $P_P$. The recessed perimeter region 250 directly about the keystem 240 has a second height $H_2$ that is less than the first height $H_1$. The height of the recessed perimeter region 250 progressively decreases from the height $H_1$ of the phantom plane $P_P$ to the second height $H_2$. In at least one embodiment, the difference between the first height $H_1$ and the second height $H_2$ is approximately 0.1 mm. In another embodiment, the difference between the first height $H_1$ and second height $H_2$ is between 0.1 mm and 0.2 mm. In another embodiment, the difference between the first height $H_1$ and second height $H_2$ is between 0.05 mm and 0.15 mm. These differences in height are attributable to the height of the dome.

As illustrated, this recessed perimeter region 250 in at least one embodiment forms a v-shape when viewed in a cross-section view such as that of FIG. 7. In another embodiment, the recessed perimeter region 250 defines an upper surface 275 which slants downwardly at an acute angel relative to a phantom plane $P_P$ in which the portion 220 of the light transmitting material lies. The recessed perimeter region 250 can slant downwardly at an acute angle of five to forty-five degrees relative to a phantom plane $P_P$ in which the portion of the light transmitting material 220 lies. In another embodiment, the recessed perimeter region 250 can slant downwardly at an acute angle of five to thirty degrees relative to a phantom plane $P_P$ in which the portion 220 of the light transmitting material lies. In another embodiment, the recessed perimeter region 250 can slant downwardly at an acute angle of ten to twenty-five degrees relative to a phantom plane $P_P$ in which the portion 220 of the light transmitting material lies.

Additionally, in order to further block light from being transmitted from the front face 205 of the lightguide panel, an opaque material 230 can be used to block the light. The front face 205 of the lightguide panel can be located immediately adjacent a backside of the opaque material 230. The opaque material 230 can be fixedly attached to the lightguide panel 200. In at least one embodiment, the opaque material 230 can be glued to the lightguide panel 200. The opaque material 230 can be a black colored material such as a plastic. In at least one embodiment, the opaque material is a black polyethylene terephthalate (PET) material. The opaque material 230 in at least one embodiment is thin and can be described as a film.

The recessed perimeter region 250 about the keystem 240 allows for reduced transmission of light and electrostatic discharge from the input key subassembly 260. This configuration reduces or eliminates any gap between the lightguide panel 200 and the opaque material 230. The input key subassembly 260 as discussed above is for an assembly that has dome switches 180 with peaks 185 facing frontally that extend some height above the dome overlay panel 191. With the positioning of the recessed perimeter region 250 as described herein, the gap that would normally form between the dome overlay panel 191 and the lightguide panel 200 is reduced or eliminated, thereby reducing or eliminating emission of light from between the lightguide panel 200 and the dome overlay panel 191. This further reduces the electrostatic discharge between the lightguide panel 200 and the dome overlay panel 191. Additionally, the above described configuration reduces or eliminates light emission between the lightguide panel 200 and the opaque material 230, as well.

Exemplary embodiments have been described hereinabove regarding the implementation of an input key subassembly 260 configured to be installed in a handheld wireless communication device 300. As described, the input key subassembly 260 comprises a dome overlay panel 191 and a lightguide panel 200 having a recessed perimeter region 250 about a keystem 240. Various modifications to and departures from the disclosed embodiments will occur to those having skill in the art. The subject matter that is intended to be within the spirit of this disclosure is set forth in the following claims.

What is claimed is:

1. An input key subassembly configured to be installed in a handheld wireless communication device to include a field of input keys in a fully assembled configuration, said input key subassembly comprising: a dome overlay panel comprising:
a dome overlay layer overlaying at least one depressible dome switch, the dome overlay layer having opposed front face and back face, the dome switch having a peak facing frontally;
a lightguide panel having a front side and a backside, the lightguide panel comprising a portion of a light transmitting material and a portion of a light impeding material about an outer perimeter of the portion of light transmitting material, the lightguide panel having:
at least one keystem extending from a front face of the portion of light transmitting material, wherein a front face of the keystem is located adjacent a backside of an input key and a back face of the keystem is above a respective said dome;
at least a portion of the lightguide panel front side comprising the light impeding material has a first height relative to the backside of the lightguide panel;
at least a portion of the lightguide panel front side comprising the light transmitting material about the keystem defines a recessed perimeter region about the keystem having a height relative to the backside of the lightguide panel less than the first height; and
said dome overlay layer front face located adjacent the backside of the lightguide panel.

2. The subassembly as recited in claim 1, the at least a portion of the lightguide panel front side comprising:
the light impeding material lies in a phantom plane;
the recessed perimeter region is below the phantom plane, and the recessed perimeter region directly about the key stem has a second height less than the first height; and
the height of the recessed perimeter region progressively decreases from the height of the phantom plane to the second height.

3. The subassembly as recited in claim 1, wherein the recessed perimeter region defines an upper surface which slants downwardly at an acute angle relative to the phantom plane in which the portion of the light transmitting material lies.

4. The subassembly as recited in claim 1, wherein the recessed perimeter region slants downwardly at an acute angle of 5 to 45 degrees relative to a phantom plane in which the portion of the light transmitting material lies.

5. The subassembly as recited in claim 1, wherein the recessed perimeter region slants downwardly at an acute angle of 5 to 30 degrees relative to a phantom plane in which the portion of the light transmitting material lies.

6. The subassembly as recited in claim 1, wherein the recessed perimeter region slants downwardly at an acute angle of 10 to 25 degrees relative to a phantom plane in which the portion of the light transmitting material lies.

7. The subassembly as recited in claim 1, wherein the light transmitting material of the light guide panel is pliable.

8. The subassembly as recited in claim 1, wherein the light impeding material of the light guide panel is pliable.

9. The subassembly as recited in claim 1, wherein the dome overlay panel is a light reflecting material.

10. The subassembly as recited in claim 1, wherein the front face of the lightguide panel is located immediately adjacent a backside of an opaque material.

11. The subassembly as recited in claim 10, wherein said opaque material has through holes to allow the at least one keystem to have a distal end located adjacent a backside of an input key.

12. The subassembly as recited in claim 1, wherein the dome overlay panel is a printed circuit board.

13. The subassembly as recited in claim 1, wherein the dome overlay panel includes at least one concentrated light source.

14. The subassembly as recited in claim 13, wherein the at least one concentrated light source is a light emitting diode.

15. The subassembly as recited in claim 1, wherein the lightguide panel has at least one connector extending from the backside of the lightguide panel to removably engage the dome overlay panel.

* * * * *

UNITED STATES PATENT AND TRADEMARK OFFICE
CERTIFICATE OF CORRECTION

PATENT NO. : 8,436,752 B2  
APPLICATION NO. : 12/338177  
DATED : May 7, 2013  
INVENTOR(S) : Chao Chen Page 1 of 1

It is certified that error appears in the above-identified patent and that said Letters Patent is hereby corrected as shown below:

TITLE PAGE:
(57) Abstract: Line 2, after "is" delete "dislosed" and insert --disclosed--.

Signed and Sealed this  
Third Day of September, 2013

Teresa Stanek Rea  
*Acting Director of the United States Patent and Trademark Office*